W. C. POLK.
APPARATUS FOR BUILDING CONCRETE AND OTHER LIKE STRUCTURES.
APPLICATION FILED SEPT. 18, 1907.
908,326.
Patented Dec. 29, 1908.
5 SHEETS—SHEET 1.
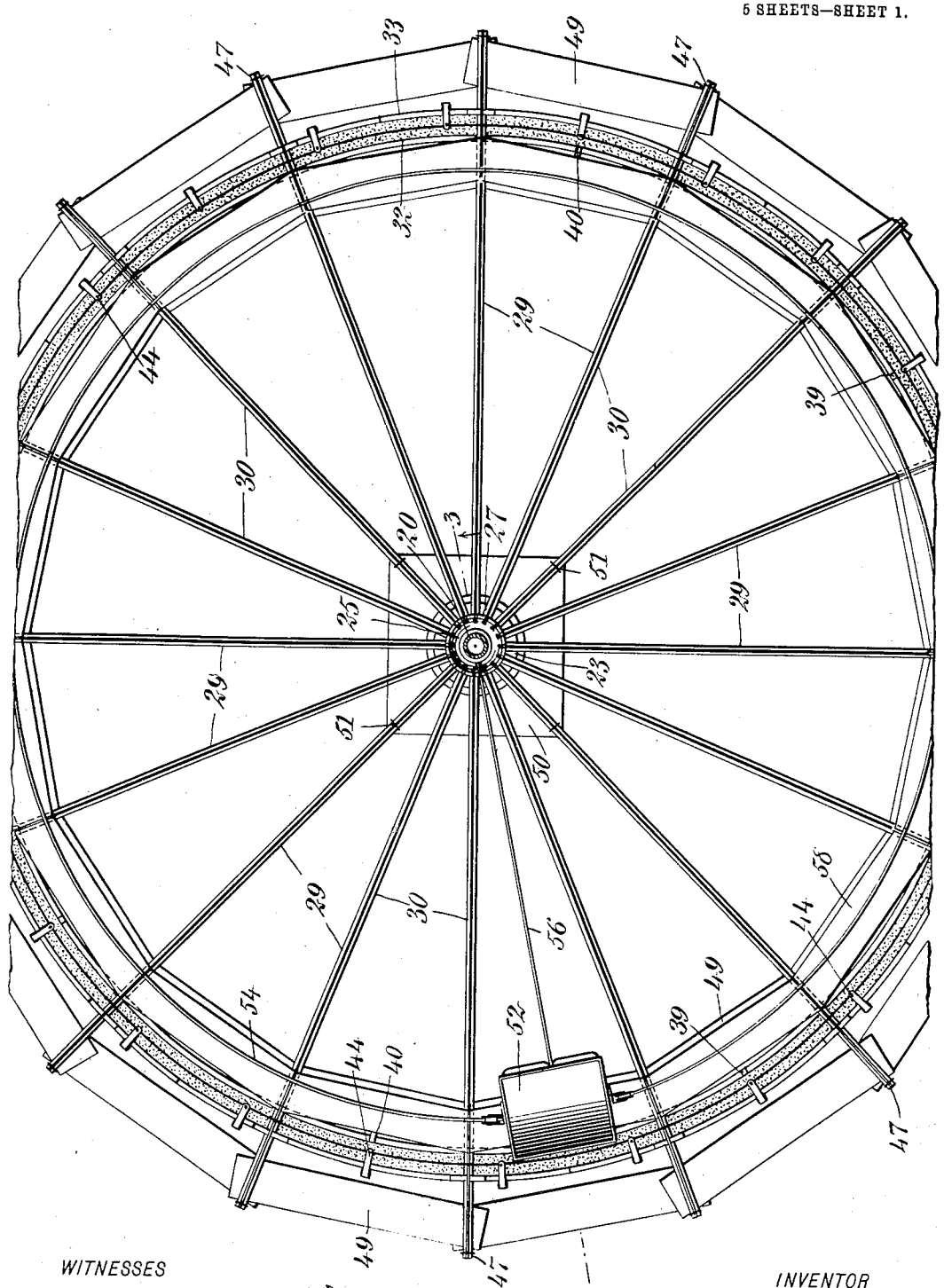
WITNESSES
Edward Thorpe,
INVENTOR
Walter C. Polk
BY
ATTORNEYS

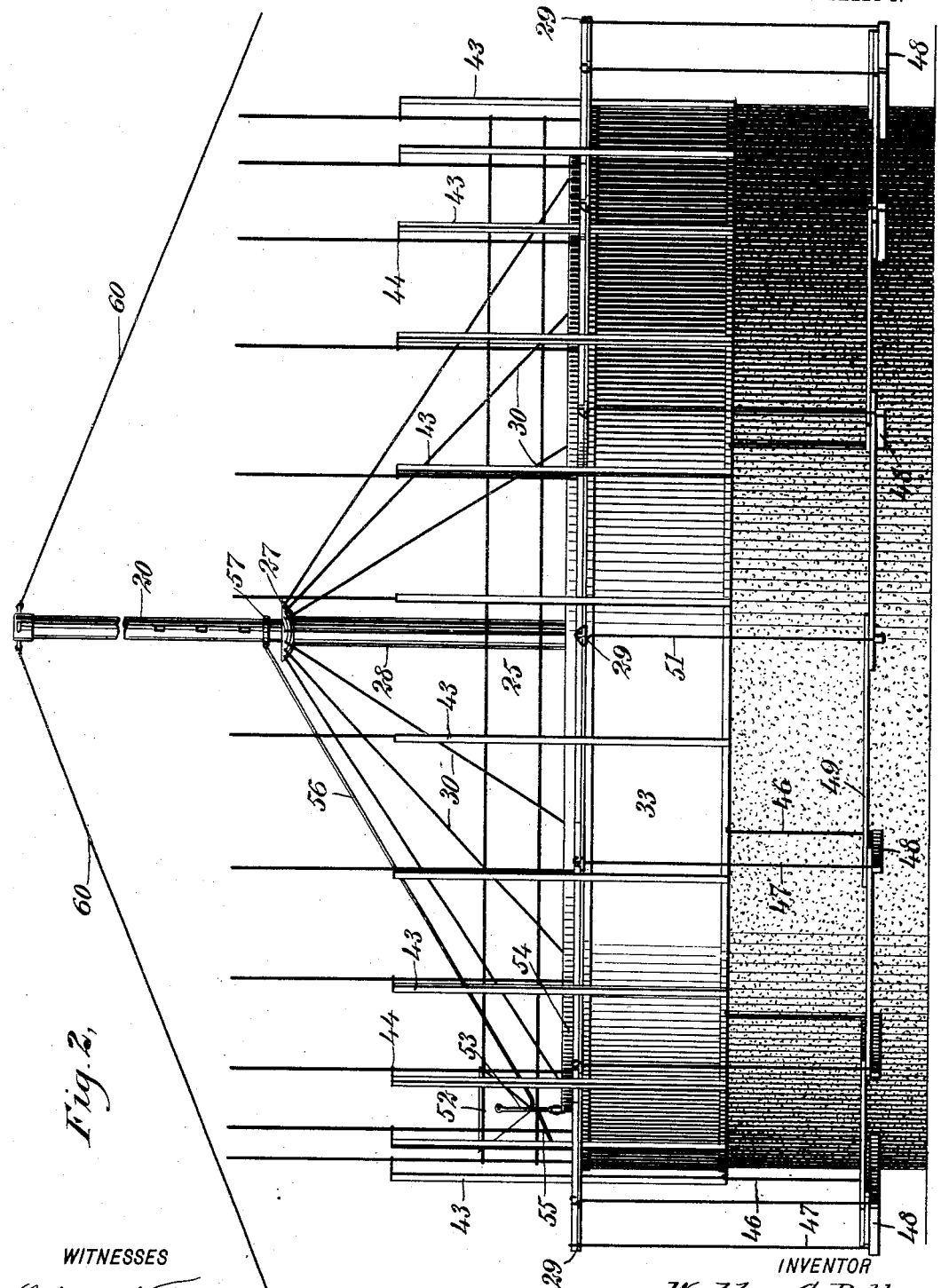

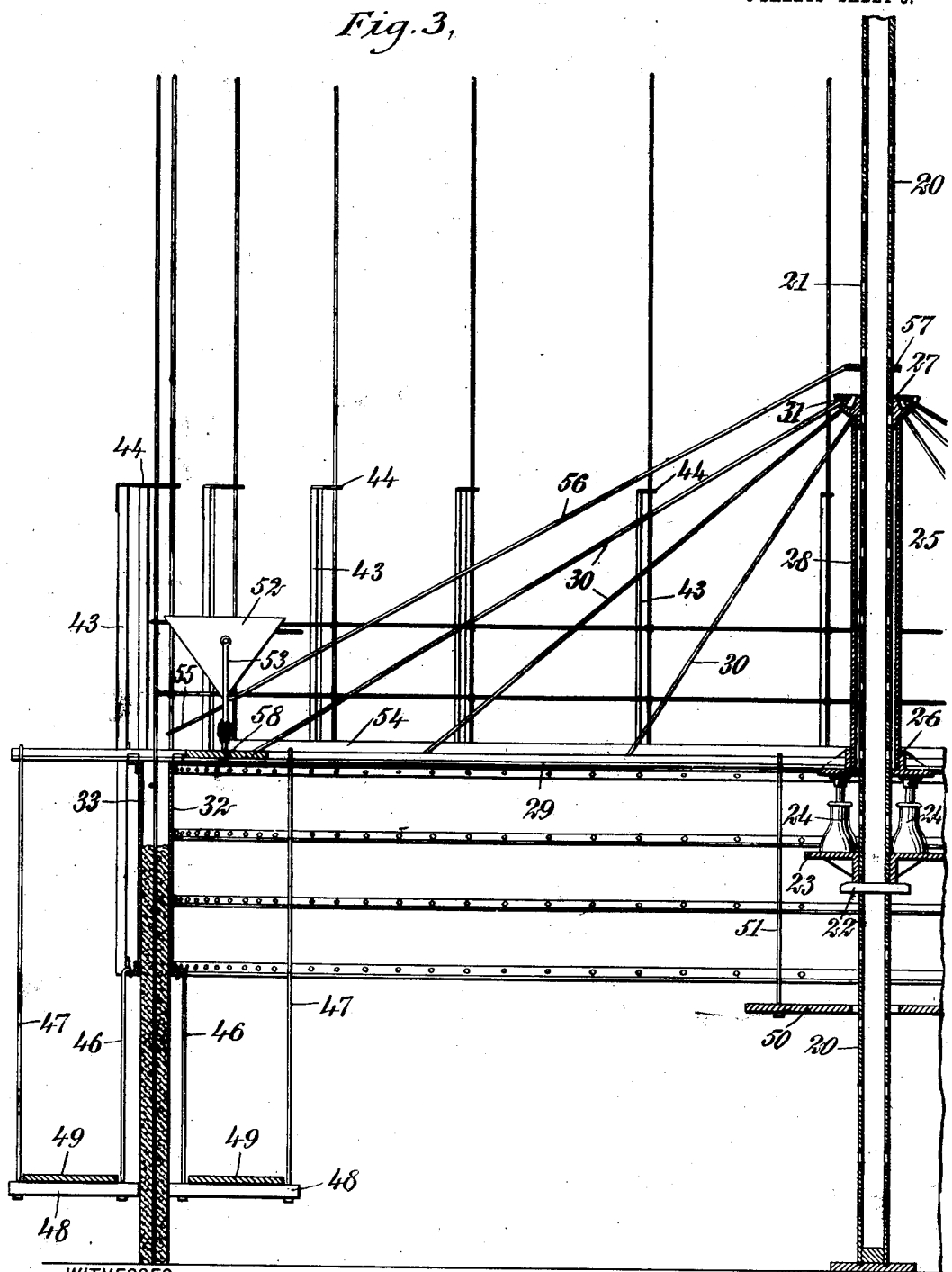

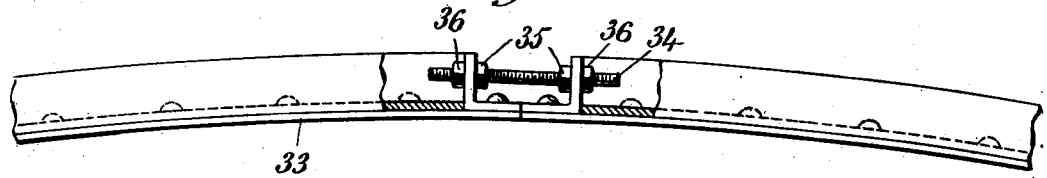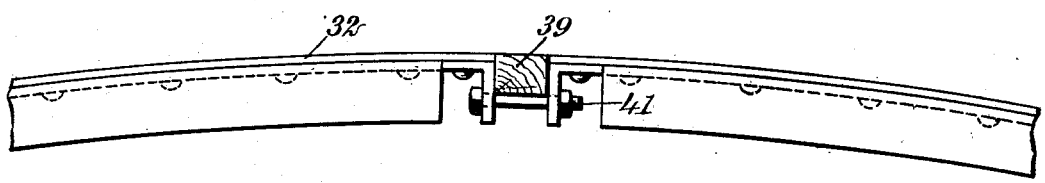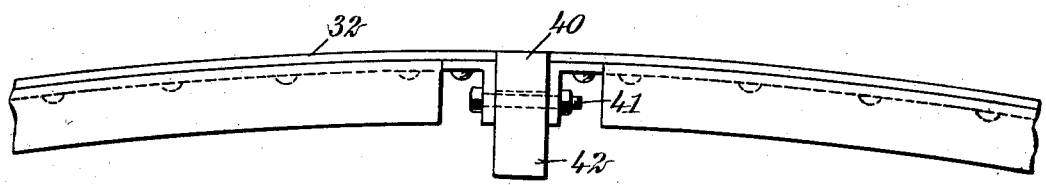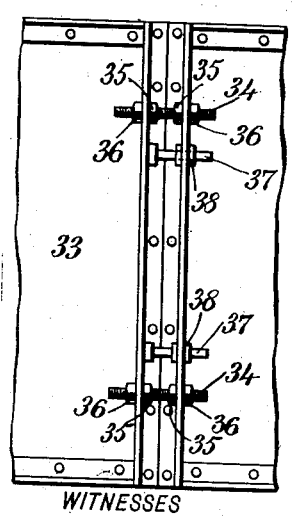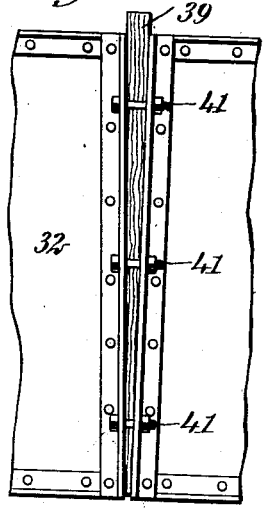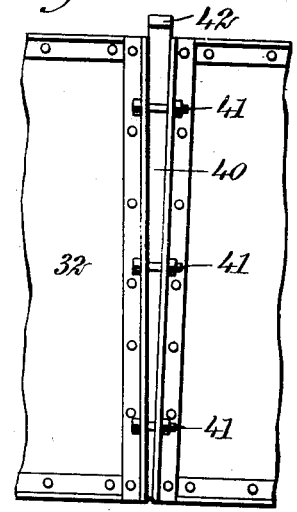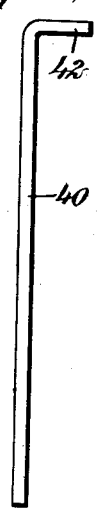

W. C. POLK.
APPARATUS FOR BUILDING CONCRETE AND OTHER LIKE STRUCTURES.
APPLICATION FILED SEPT. 18, 1907.
908,326.
Patented Dec. 29, 1908.
5 SHEETS—SHEET 5.
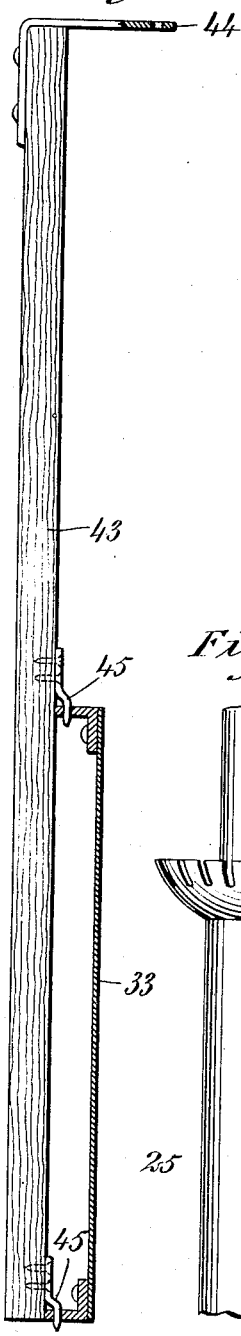
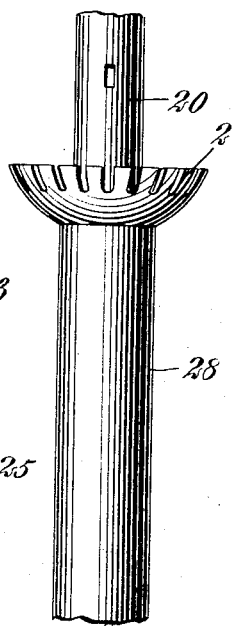
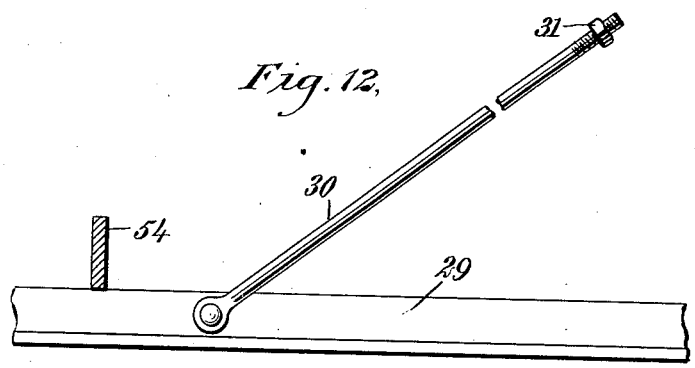
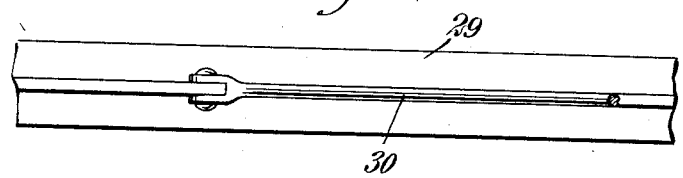
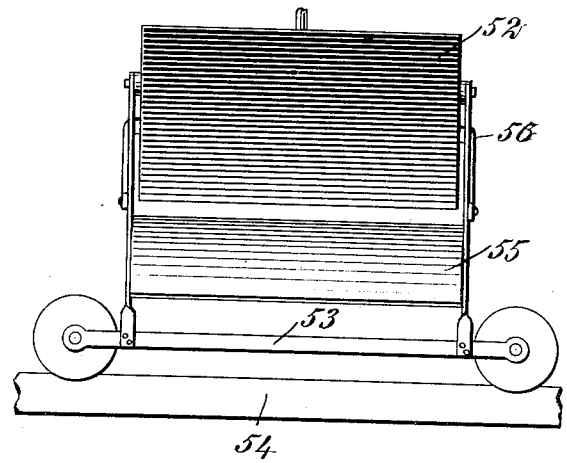
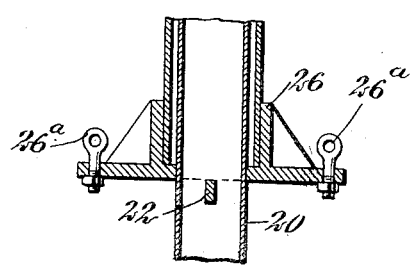

UNITED STATES PATENT OFFICE.

WALTER C. POLK, OF FORT BRANCH, INDIANA.

APPARATUS FOR BUILDING CONCRETE AND OTHER LIKE STRUCTURES.

No. 908,326.  Specification of Letters Patent.  Patented Dec. 29, 1908.

Application filed September 18, 1907. Serial No. 393,455.

*To all whom it may concern:*

Be it known that I, WALTER C. POLK, a citizen of the United States, and a resident of Fort Branch, in the county of Gibson and State of Indiana, have invented new and useful Improvements in Apparatus for Building Concrete and other Like Structures, of which the following is a full, clear, and exact description.

This invention has reference to an improved means and method of building concrete walls for circular and angular structures, and has for objects, among others, to provide for the supporting of the forms independently of the concrete, whereby the green concrete will not be strained or broken by the weight of the forms or by removing the forms after the concrete has set; also to provide for the convenient releasing and resetting of the forms and for their repeated elevation as the building of the wall proceeds, whereby the same forms are continuously used and much time and labor consequently saved; and further, to so support the forms that they will be held perfectly plumb and level and will not require further attention in this respect after the support has once been properly set.

The invention further resides in certain novel features of construction and arrangement of parts, as will be hereinafter described and claimed.

Reference is to be had to the accompanying drawings forming a part of this specification, in which similar characters of reference indicate corresponding parts in all the views.

Figure 1 is a plan of one embodiment of my improved apparatus as when used in building a circular structure; Fig. 2 is a side elevation of the same; Fig. 3 is a fragmentary central sectional view of the apparatus on the line 3—3 of Fig. 1; Fig. 4 is a plan partly in section of the connection between two of the sections of the outer form; Fig. 5 is a similar view showing the connection between two sections of the inner form; Fig. 6 shows in plan, the connection between two sections of the inner form; this mode of connection preferably alternating with that shown in Fig. 5; Fig. 7 is a side elevation of the construction shown in Fig. 4; Fig. 8 is a side elevation of the construction shown in Fig. 5; Fig. 9 is a side elevation of the construction shown in Fig. 6; Fig. 10 is an edge view of a wedge which is employed in making the connection between the alternate inside forms, as shown in Figs. 6 and 9; Fig. 11 is a vertical section of the outside form, illustrating the manner in which stanchions are supported therefrom, as are employed to retain the vertical reinforcing; Fig. 12 is a fragmentary view of one of the radiating T irons and its connecting tension-rod; Fig. 13 is a plan of the construction shown in Fig. 12; Fig. 14 is a side elevation of a car which is used for carrying and discharging the concrete; Fig. 15 is a partial view of the hub and mast; Fig. 16 is a perspective view of a key for supporting the hub upon the mast; and Fig. 17 is a central vertical sectional view through the lower end of the hub.

In the construction of my improved apparatus, I employ a mast 20 which is preferably in the nature of a pipe, and is provided with a series of transverse openings 21 which are adapted to receive a key 22, shown in detail in Fig. 16, upon which is supported a widely-flanged collar 23, the latter serving to support a plurality of jacks 24 upon which rests a hub 25. This hub, as best shown in Fig. 3, is composed of a flanged base-collar 26 and a top dished collar 27, which are connected together by a central pipe 28, the said pipe having a bore somewhat larger than the external diameter of the mast, and the collars closely and slidably fitting the mast, whereby the hub may be slid thereon without undue friction.

The collar 26 has a number of ribs formed on its upper face, dividing it into a series of pockets within which rest the inner ends of a series of radiating T irons or ribs 29, each rib being connected with the upper collar 27 of the hub through the intermediary of a tension-bar or guy 30; this connection being effected by forming the bar with a forked end and pivotally connecting it to the central rib of the iron, as illustrated in Fig. 13; the bar being attached to the collar 27 by passing it into one of a series of notches formed in the edge of the collar, and thereafter tightening a nut 31 threaded on the extremity of the rod.

The T irons or ribs are rigidly attached, as by clamps or other devices, to the top edge of inner and outer forms 32 and 33, respectively; the body of said forms being preferably made of sheet metal and each form being composed of a plurality of separable sections, each section having an angle-iron border riveted or otherwise secured thereto, and as many other angle irons or other reinforcing bars, as desired, secured in an intermediate position, as illustrated in Fig. 3.

The separable sections of the outer form, as best shown in Fig. 4, are connected together by threaded studs 34 which pass through alining apertures formed in opposing angle-irons, and are each provided with an inner and outer set of nuts 35 and 36, respectively; the inner set bearing on the inner faces of the angle-irons and serving to separate the sections and expand the form when screwed outwardly, and the outer set of nuts operating when tightened to draw the sections of the form together.

In order that the sections of the outer form will remain in alinement when separated, the angle-iron at the end of the section is provided with dowel-pins 37 rigidly attached thereto, which pass through apertures of bosses 38 in the angle-iron of the next adjacent section, the said bosses providing extended bearings for the dowel-pins, which prevent any substantial variation of alinement of the sections when the nuts on the studs 34 are loosened.

The opposing angle-irons at the ends of the separable sections of the inner form are reversely turned from that of the corresponding angle-irons on the sections of the outer form, as shown in Figs. 5, 6, 8 and 9, and are each arranged on a slight inclination providing a tapering space between each section. These tapering spaces, when the inner form is set up, are alternately filled with wooden and iron wedges 39 and 40, respectively, the said wedges when in position serving to expand the form and have their inner faces flush with the inner faces of the adjacent sections, whereby a smooth finish will be given to the wall on these lines.

The opposing ends of the sections of the inner form are held together by a plurality of bolts 41 which pass through the flanges of the angle-irons at the inside of the wedges. The iron wedges 40 have angularly and inwardly-turned ends 42, which admit of these wedges being driven out, as when contracting the form to shift it to a different position.

Detachably connected to the outer form 33 are a series of stanchions 43, each of which is provided at its upper end with an inwardly-directed overhanging arm 44 which is provided with an aperture for receiving and retaining the vertical reinforcing rods for the wall, as best shown in Fig. 3. These rods, as the building of the wall proceeds, are twined about transversely by other reinforcing rods or other form of horizontal reinforcing, as desired.

For detachably connecting each stanchion 43 with the outer form, I preferably attach to the stanchion, depending off-set pins or dowels 45, which are spaced apart a distance equal to the width of the form, and engage with alining apertures formed in the bottom and top angle-irons, as clearly illustrated in Fig. 11.

As the building of the wall proceeds and the forms are elevated above the ground, scaffolding or staging is provided at both sides of the wall, as shown in Figs. 2 and 3, said scaffolding consisting of rods 46 and 47, having upper hooked extremities which are engaged respectively with apertures in the bottom angle-irons of the forms and with the ribs 29. The lower ends of the rods carry cross-bars 48, upon which the flooring 49 of the scaffolding is laid. This scaffolding serves to support the workmen in pointing up the wall as the course of construction thereof proceeds, also to release and reset the forms. The ribs 29 also support a scaffold at the center of the apparatus, which consists of a platform 50 surrounding the mast 20, and connected with the ribs 29 by rods 51; these rods having upper hooked extremities for engaging the ribs 29 in the same manner as do the rods 47.

For filling in between the forms after they have been properly set, I provide a dumping car 52, the body of which is substantially V-shaped in cross section and pivotally supported between a centrally-arranged yoke frame 53, the latter being provided with grooved wheels at opposite ends which engage and travel over a rail 54 running about on the ribs 29 near the inner marginal edge of the space between the forms. The frame 53 of the car is also provided with a rigidly attached chute or apron 55 which catches the concrete falling short of the space between the forms, and discharges it thereinto. In order to keep the car balanced on the single frame shown, and prevent it from tipping over, the frame is pivotally connected between the yoked outer end of a rod 56, the said rod having a pivotal connection with a collar 57 which is journaled on the mast 20; this construction serving not only to support the car in an upright position, but also aiding in directing it over the track 54.

For the purpose of supporting the workmen while tamping the concrete between the forms, and also for operating the car 52, scaffolding is arranged adjacent to and over the inner form, which consists of a series of boards 58 seated on the horizontal flanges of the ribs 29.

In the operation of the apparatus, after the first section or height of wall has been formed, the inner form is contracted by driving out the iron wedges between the alternate sections of the form, then loosening the bolts of the sections of the form at the wooden wedges, and thereafter tightening the bolts where the iron wedges have been driven out. By this operation the inner form is loosened from the wall.

The outer form is expanded to release it from the wall by backing off the nuts 36 from the studs 34, and thereafter tightening the inner set of nuts 35, which frees the form entirely from the outer face of the wall, leaving it in condition to be elevated and set in position to form the succeeding horizontal section of the wall. This elevation of the forms is accomplished by working the jacks 24, or it may be done by attaching the lower collar 26 of the hub 25 to a hoisting apparatus. The connection of such a hoisting apparatus with the collar 26, as shown in Fig. 17, may be made by eye-bolts 26ª which pass through the flange of the collar. In the event this manner of elevating the hub forms and connecting mechanism be adopted, the collar 23 and jacks will be dispensed with, and the collar 26 will rest directly on the key 22. When the forms have been carried to the proper elevation and the key 22 inserted through the openings of the mast underneath the collar 23 or 26, as the case may be, the inner form is expanded to again carry it in contact with the inner face of the wall already formed by driving in the wedges and tightening the bolts. The outer form is then contracted by reversing the operation of the nuts 35 and 36 as when expanding the form. The horizontal reinforcing is bent to the proper radius into the form as the latter is brought up, and lashed to the vertical reinforcing bars, which are retained in a substantially vertical position by the stanchions 43 and overhanging apertured arms 44.

It is not ordinarily possible for a workman to get between the forms in doing the lashing, which makes it necessary to suspend to the T irons or ribs 29, the horizontal reinforcing during the first setting of the forms, since the vertical reinforcing is not firm enough to retain the horizontal reinforcing bars until after the first setting of the concrete.

Each time the forms are elevated and secured in position, they are filled by the car 52, which in its travel passes under any suitable source of concrete supply. In the dumping of the car, about two-thirds of the contents of the car body will dump directly about the forms, while the remainder will flow on to the apron or chute and pass into the forms in this manner.

When the height of the wall has advanced sufficiently to bring the top of the hub to substantially the elevation of the upper ends of the tension-bars or guys, braces are placed between the mast and finished wall below the swinging scaffolds, and the guys then removed. This prevents any springing of the mast, the upper portion of which as shown in Fig. 2, is braced by guys 60, which hold the mast at all times in a true vertical position. When the hub of the apparatus reaches the top of the first section of the mast, it is obvious that another section may be added thereto and the height of the wall continued indefinitely.

While I have shown my improved apparatus as applied to a circular structure, the same may be adapted with slight modifications in the details of construction to angular structures, as concrete houses, etc. The apparatus may also be modified in numerous particulars from that herein shown and described without departing from the nature of the invention as defined within the scope of the annexed claims.

Having thus described my invention, I claim as new and desire to secure by Letters Patent:

1. In an apparatus for building concrete structures, metal forms having angle-irons attached to the marginal edges thereof, stanchions having depending off-set pins for engaging apertures in the angle-irons of one of said forms, and an overhanging apertured arm attached to each of said stanchions for maintaining the vertical reinforcing of the concrete structure in a substantially vertical position.

2. In an apparatus for building concrete structures, metal forms having angle-irons at the bottom and top edges thereof, a mast, a hub slidable on the mast, ribs connecting the forms with the hub, and scaffolds suspended from the ribs and the lower angle-irons of the forms at the opposite sides of the structure.

3. In an apparatus for building concrete structures, metal forms having angle-irons at the bottom and top edges thereof, a mast, a hub slidable on the mast, ribs connecting the forms with the hub, scaffolds suspended from the ribs and the lower angle-irons of the forms at each side of the structure, and a platform suspended from the ribs surrounding said mast.

4. In an apparatus for building concrete structures, a mast, a hub slidable on the mast, forms, means connecting the forms with the hub, a collar supported on the mast below the hub, and jacks uniformly distributed about and seated on the collar for elevating the hub on the mast.

5. In an apparatus for building concrete structures, a mast, forms, means for supporting the forms from the mast, a track carried by said supporting means adjacent to the forms, a dumping car movable over said track, and means connecting said car with the mast.

6. In an apparatus for building concrete walls, a mast, a hub slidable on the mast, forms, means connecting the forms with the hub, means detachably connected to the forms for maintaining the vertical reinforcing of the wall in a substantially vertical position, scaffolds suspended from the forms and from said connecting means at each side of the wall, and a platform suspended from said connecting means and surrounding the mast.

In testimony whereof I have signed my name to this specification in the presence of two subscribing witnesses.

WALTER C. POLK.

Witnesses:
 WILLIAM A. POLK,
 HOMER T. GENUNG.